UNITED STATES PATENT OFFICE.

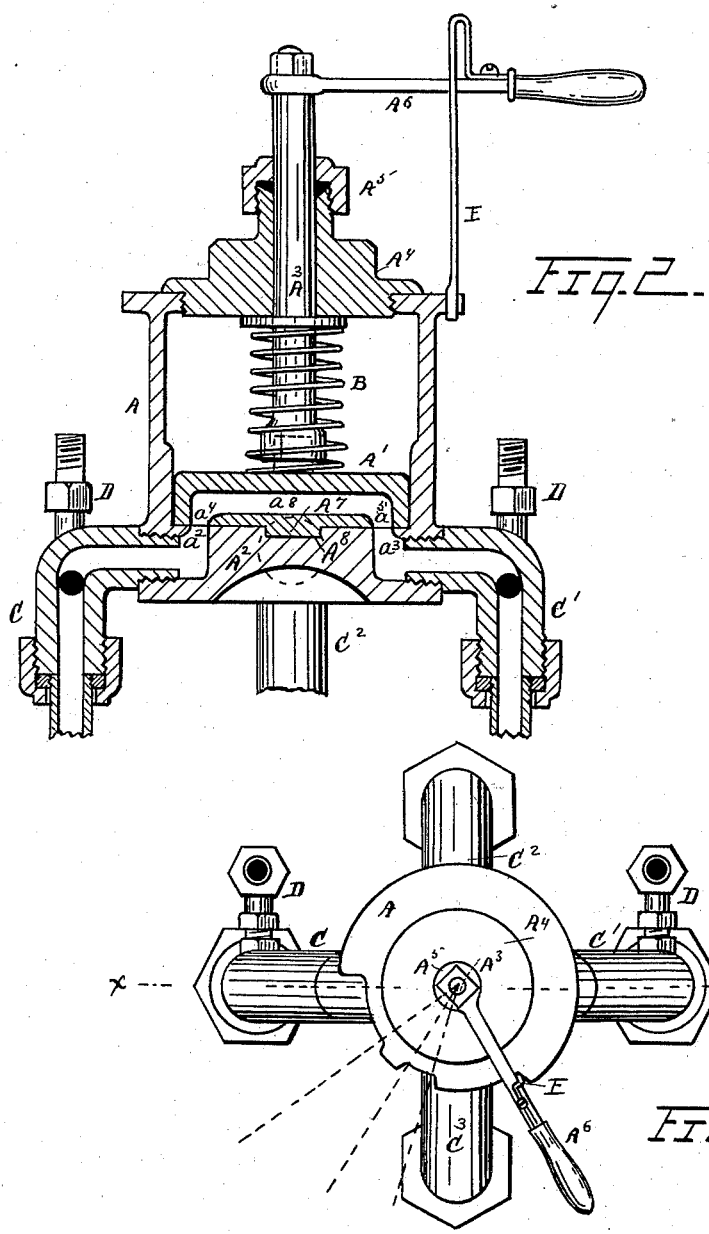

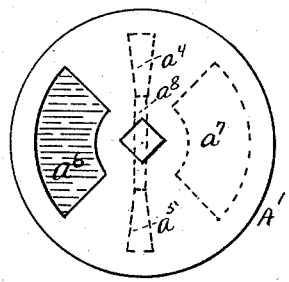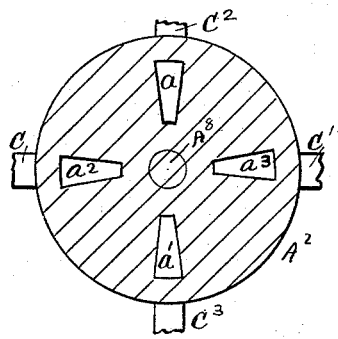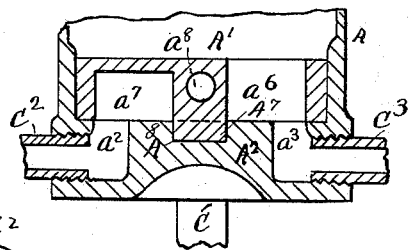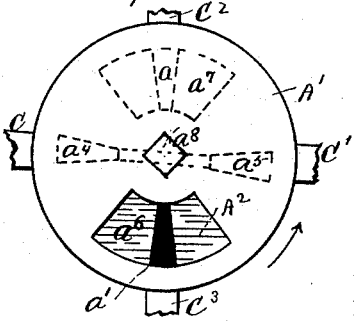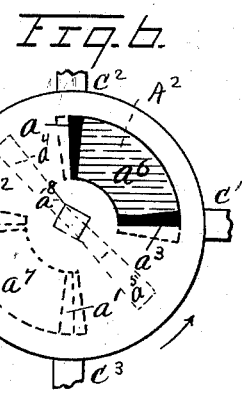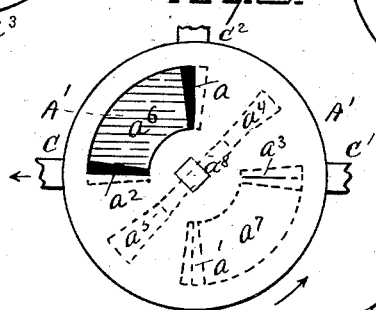

WILLIAM RYMER, OF DETROIT, MICHIGAN.

FOUR-WAY VALVE.

SPECIFICATION forming part of Letters Patent No. 477,706, dated June 28, 1892.

Application filed March 26, 1891. Serial No. 386,477. (No model.)

*To all whom it may concern:*

Be it known that I, WILLIAM RYMER, a citizen of the United States, residing at Detroit, county of Wayne, State of Michigan, have invented a certain new and useful Improvement in a Four-Way Valve; and I declare the following to be a full, clear, and exact description of the invention, such as will enable others skilled in the art to which it appertains to make and use the same, reference being had to the accompanying drawings, which form a part of this specification.

My invention relates to certain new and useful improvements in a four-way valve; and it consists of the devices and appliances hereinafter specified and claimed, and illustrated in the accompanying drawings, in which—

Figure 1 is a plan view embodying my invention. Fig. 2 is a vertical section of the same on the line $x\,x$, Fig. 1. Fig. 3 is a plan view of the face of the valve. Fig. 4 is a plan view of the valve-seat. Fig. 5 is a detail view in plan showing the valve in a certain position relative to the valve-seat. Fig. 6 is a similar view showing the valve in a position to admit the power-supply to the pipe C'. Fig. 7 is a vertical section through the valve-head and valve-seat at right angles to that shown in Fig. 2, and Fig. 8 is a plan view showing the position of the valve when admitting power to the pipe C.

My invention, while designed for any use to which it may be found adapted, is especially applicable in connection with a certain steering apparatus for which Letters Patent were granted to me by the United States March 17, 1891, No. 448,263, in which two power-conducting pipes are communicable with each other by means of a controlling-valve, an additional pipe leading from the power-supply, and an exhaust or relief pipe being also communicable with the valve. The drawings and specifications herewith explain the construction of my improved valve in connection with such a mechanism.

Accordingly A represents a valve-case provided with a rotatable and reciprocatory valve A' and a valve-seat $A^2$. The valve A' is engaged with a stem $A^3$, projecting through the cap $A^4$. The valve-stem may be provided with an operating handle or lever $A^6$. A spring B is located between the valve A' and cap $A^4$. The valve-case A is constructed with a chamber above the valve, as shown in Fig. 2, to receive said spring, and within which the valve may reciprocate. The stem may be engaged with the valve in any suitable manner. Communicating with the base of the valve-case are two power-conducting pipes C and C', also a supply-pipe $C^2$ and an exhaust or relief pipe $C^3$. The two pipes C and C' may each be provided with a pressure-gage connection D.

The valve-seat, it will be observed by reference particularly to Fig. 4, is constructed with an admission-port $a$, communicating with the pipe $C^2$, and an outlet-port $a'$, communicating with the pipe $C^3$, also with a port $a^2$, communicating with the pipe C, and a port $a^3$, communicating with the pipe C'.

The valve A' is constructed on its under surface with ports $a^4\,a^5$, a port $a^6$, opening through the valve into the valve-case, and a closed port $a^7$. The ports $a^4\,a^5\,a^7$ do not communicate through the head of the valve into the case A, but the ports $a^4\,a^5$ are connected by a channel $a^8$ in the underside of the valve.

It will be seen that in the position of the valve shown in Fig. 2 the power in the pipes C C' is in equilibrium, the ports $a^2\,a^4$ and $a^3\,a^5$ being in coincidence. In this case the valve is located to correspond with the position indicated in Fig. 5, in which it will be observed the valve-ports $a^4\,a^5$ lap the ports $a^2\,a^3$ of the valve-seat, bringing the open port $a^6$ of the valve over the port $a'$ of the valve-seat and the closed port $a^7$ of the valve over the port $a$ of the valve-seat, cutting off the power-supply and opening the valve-case to the exhaust-pipe $C^3$.

In Fig. 6 the valve is shown turned into position to admit the power-supply entering through the pipe $C^2$ into the conducting-pipe C'. In this case the port $a^6$ of the valve laps the ports $a$ and $a^3$ of the valve-seat, thereby affording communication from pipe $C^2$ to pipe C'. In this position it will be seen the port $a^7$ of the valve laps the ports $a^2$ and $a'$, allowing the pipe C to exhaust through the pipe $C^3$.

As shown in Fig. 8, the pipe $C^2$ communicates with the pipe C. When the valve is adjusted for this purpose, it will be seen the valve-port $a^6$ laps the ports $a\,a^2$ of the valve-seat. The port $a^7$ of the valve also laps the ports $a'$ and $a^3$ of the valve-seat, allowing the pipe $C'$ to exhaust. This adjustment of the valve may be made by turning the valve from the position indicated in Fig. 6 in the direction of the arrow to the position shown in Fig. 8.

These various illustrations and descriptions of different positions of the valve to accomplish desired results will give a clear understanding of the construction and operation of the valve.

Between the various ports of the valve and valve-seat, respectively, it will be understood, each is constructed with separating-bridges, as shown.

The valve is constructed with an annular shoulder $A^7$, having a bearing in a socket $A^8$ in the valve-seat.

It will be observed that the construction of the valve is such as to render it a safety-valve, inasmuch as the tension of the spring seats the valve under normal pressure; but should the pressure through the power-supply pipe become greater than the tension of the spring the valve would be lifted by said pressure from its seat, allowing the pressure to reduce, when the spring will again seat the valve.

By means of a spring E, engaged with the lever $A^6$, the lever can be held in desired position, the spring having a bearing upon the upper rim of the valve-case, which may be recessed, as desired, to hold the spring in proper position, as shown in Fig. 1. A valve so constructed overcomes all liability of leakage.

What I claim as my invention is—

1. A four-way valve consisting of a valve-case provided with a valve-seat having in combination therewith a rotatable valve located upon the seat, said seat constructed with ports $a$ $a'$ $a^2$ $a^3$ and said valve with ports $a^4$ $a^5$ $a^6$ $a^7$, and two of said valve-ports $a^6$ and $a^7$ each being large enough to communicate with two of the seat-ports at the same time, and the remaining two $a^4$ and $a^5$ not being large enough to communicate with two of the seat-ports at the same time, and a channel in the valve connecting the ports $a^4$ and $a^5$, substantially as described.

2. A four-way valve consisting of a valve-case provided with a valve-seat having in combination therewith pipes C C' $C^2$ $C^3$, ports communicating through said seat with said pipes, a rotatable and reciprocating valve located upon said seat and constructed with ports $a^4$ $a^5$ $a^6$ $a^7$, and a channel $a^8$, connecting the ports $a^4$ and $a^5$, two of said valve-ports being large enough to communicate with two of the seat-ports at the same time and the other two being of the same size as the seat-ports, the large and the small ports of the valve alternating with each other respectively, substantially as described.

3. A four-way valve consisting of a valve-case provided with a valve-seat having in combination therewith a rotatable and reciprocatory valve located upon said valve-seat, said seat being constructed with ports $a$, $a'$, $a^2$, and $a^3$, and the valve with ports $a^4$, $a^5$, $a^6$, and $a^7$, and a channel $a^8$, connecting the ports $a^4$ and $a^5$, said case forming a chamber above the valve within which the valve may reciprocate, two of said ports $a^6$ and $a^7$ each being large enough to communicate with two of the seat-ports at the same time and one of them $a^6$ extending through the valve, whereby communication is established with the interior of the chamber and back-pressure is overcome, and a spring within the chamber pressing against the top of the valve, substantially as described.

4. A four-way valve consisting of a case provided with a valve-seat and having its upper rim recessed, said case having in combination therewith a valve and valve-stem projecting through said case, a lever secured to the stem, and a spring secured to the lever, the lower end of which is adapted to engage with the recesses of the rim of the case for holding the valve in a desired position, said seat being provided with ports $a$, $a'$, $a^2$, and $a^3$ and the valve being provided with communicating ports $a^4$ and $a^5$ and with ports $a^6$ and $a^7$, substantially as described.

In testimony whereof I sign this specification in the presence of two witnesses.

WILLIAM RYMER.

Witnesses:
N. S. WRIGHT,
JOHN F. MILLER.